United States Patent
Miksis

(10) Patent No.: US 7,661,443 B1
(45) Date of Patent: Feb. 16, 2010

(54) POINT REPAIR SLEEVE CARRIER FOR CONDUITS

(76) Inventor: Gary F. Miksis, P.O. Box 591-I, Healdsburg, CA (US) 95448

( * ) Notice: Subject to any disclaimer, the term of this patent is extended or adjusted under 35 U.S.C. 154(b) by 70 days.

(21) Appl. No.: 11/986,010

(22) Filed: Nov. 17, 2007

(51) Int. Cl.
*F16L 55/16* (2006.01)

(52) U.S. Cl. .......................... 138/98; 138/93; 138/119; 138/120; 405/150.1; 405/184.2

(58) Field of Classification Search ............... 138/97, 138/98, 93, 119, 120; 405/150.1, 184.2
See application file for complete search history.

(56) References Cited

U.S. PATENT DOCUMENTS

| | | | | |
|---|---|---|---|---|
| 3,167,122 A | * | 1/1965 | Lang | 166/277 |
| 3,298,399 A | * | 1/1967 | Slade | 138/97 |
| 3,593,749 A | | 7/1971 | Reardon | |
| 3,642,032 A | * | 2/1972 | Cook et al. | 138/97 |
| 3,946,761 A | * | 3/1976 | Thompson et al. | 138/98 |
| 3,951,173 A | | 4/1976 | Larson | |
| 4,421,698 A | * | 12/1983 | Vanderlans | 264/40.1 |
| 5,044,405 A | | 9/1991 | Driver et al. | |
| 5,049,003 A | * | 9/1991 | Barton | 405/184.1 |
| 5,066,208 A | * | 11/1991 | Warmerdam | 425/13 |
| 5,706,861 A | * | 1/1998 | Wood et al. | 138/98 |
| 5,727,597 A | * | 3/1998 | Fisco | 138/98 |
| 6,019,136 A | | 2/2000 | Walsh | |
| 6,626,447 B2 | * | 9/2003 | Nelson et al. | 280/79.11 |
| 6,820,653 B1 | * | 11/2004 | Schempf et al. | 138/98 |
| 7,052,567 B1 | * | 5/2006 | Blackmore et al. | 156/94 |
| 2006/0243337 A1 | * | 11/2006 | Manners | 138/98 |

* cited by examiner

*Primary Examiner*—James F Hook
(74) *Attorney, Agent, or Firm*—Richard Esty Peterson, Esq.

(57) ABSTRACT

A repair sleeve carrier for transporting a repair liner into a conduit to the location of damage or leakage for repairing the conduit from the inside, the sleeve carrier having a segmented flex tubing and a bladder with ends attached to the flex tubing and an unattached middle portion forming a cavity between the middle portion of the bladder and the flex tubing with an air passage to the cavity, the sleeve carrier having an air supply connect or that connects to an air supply to provide pressurized air to the cavity through the passage to inflate the bladder.

10 Claims, 2 Drawing Sheets

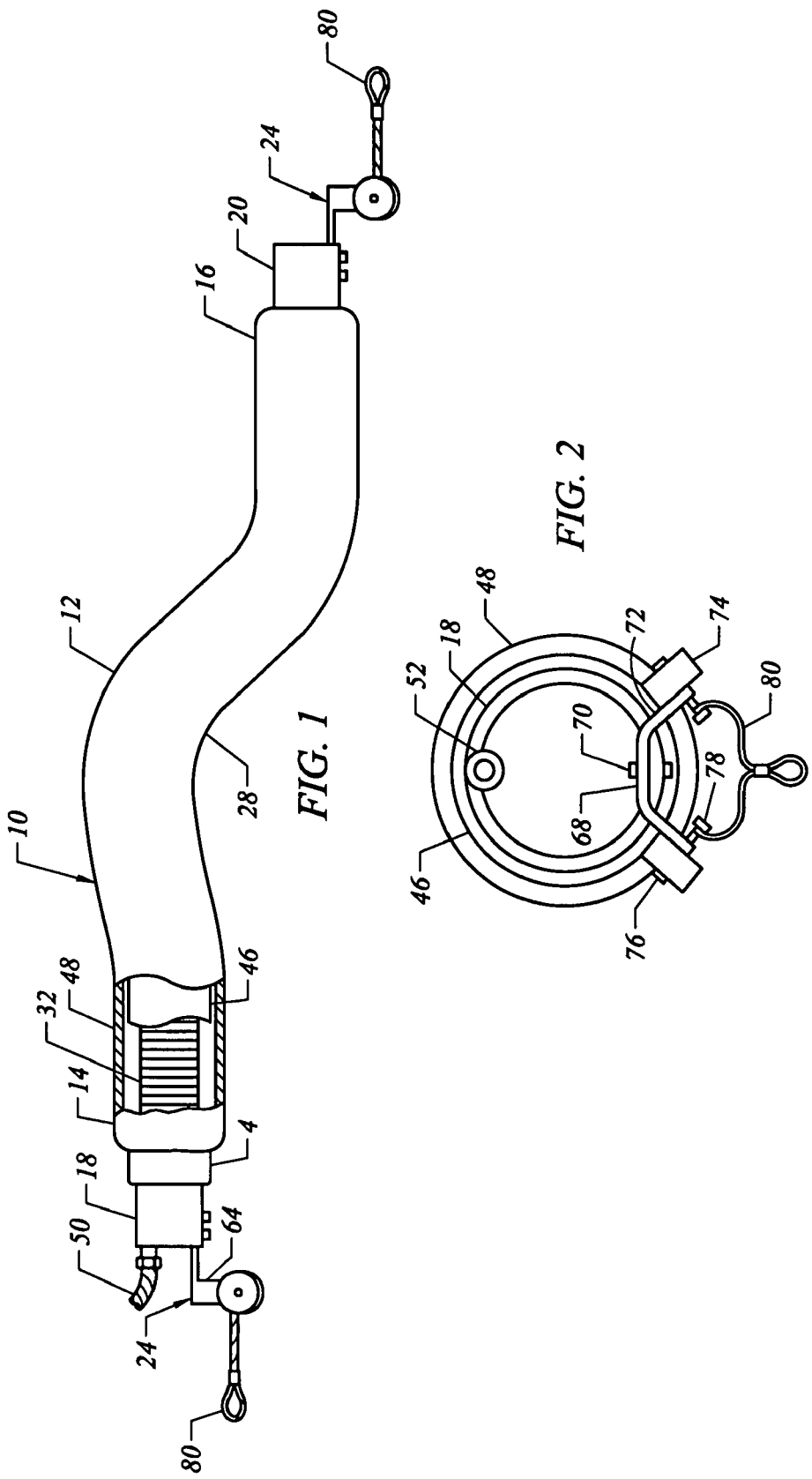

POINT REPAIR SLEEVE CARRIER FOR CONDUITS

BACKGROUND OF THE INVENTION

This invention relates to an improved carrier for installing a repair liner at the location of a damaged or leaking portion of conduit, typically a gravity flow sewer line or a service line. When an underground pipe leaks or is damaged, it is extremely expensive to excavate and externally repair or replace a segment of the pipe line. In many situations, the pipe line can be internally repaired at a great savings in cost and time.

The improved point repair sleeve carrier of this invention is designed to transport a repair liner wrapped around a bladder portion of the carrier to the point of repair, wherein the bladder is inflated and the liner in the form of a circumferential sleeve is pressed against the wall of the conduit.

Techniques in repairing larger concrete pipe with a cementicious composition, by packing ejected composition against the inside wall of the pipe at the location to be repaired using an inflatable bladder device, have been applied to repairs using a repair liner. The repair liner is typically a durable fabric material, such as a carbon or polyester fiberglass composite, impregnated with a thermo-setting polymer resin that cures in place. The sleeve carrier is similar to a repair packer and has an expandable bladder for forcing the repair material against the inner wall of a conduit. The resin impregnated liner is wrapped around an elongated expandable bladder as a sleeve. Since the sleeve must conform to the inner wall of the pipe that has a larger diameter than the deflated carrier bladder, the liner must be folded or overlapped when installed on the bladder. The expanded sleeve must also be released from the carrier bladder when the bladder is deflated and the carrier withdrawn from the pipe. When cured, the liner forms a structural repair that in many instances is stronger than the original conduit.

Various methods have been devised to retain the liner on the carrier to minimize dislodging the liner when the carrier is drawn through the pipe to the location of the repair. In Walsh et al., U.S. Pat. No. 6,019,136, issued Feb. 1, 2000, an improved system is described for attaching a liner to an inflatable carrier using Velcro® straps to minimize dislocation of the liner. Other methods, such as the use of disposable twist ties, may be used to secure the liner to the carrier. The liner is wrapped as a sleeve on the carrier bladder and is nevertheless subject to dislodgment by contact of the leading edge of the sleeve with the walls of the pipe, particularly when encountering joints or laterals.

In addition to methods for temporarily securing a liner to the carrier to prevent dislocation of the liner, improvements to the design of the carrier can also minimize the potential for dislodging the liner during installation.

Adding a guide flange or wheeled carriage to at least the lead end of the carrier elevates the carrier end and reduces snagging of the lead edge of the wrapped liner sleeve. Attempts to stiffen the elongated carrier reduce the ability of the carrier to flex or bend when attempting to insert the carrier into a horizontal pipe through a vertical manhole have been problematic. The carrier frequently must be inserted through a vertical manhole into a horizontal pipe and therefore requires that the carrier be flexible during initial installation.

The improved point repair sleeve carrier 10 of this invention solves many of the problems and difficulties in installing a releasable liner wrapped on an expandable bladder of a supporting carrier.

SUMMARY OF THE INVENTION

The improved point repair line carrier of this invention is designed to install a repair liner internally in a conduit. The advantages of installing a repair liner internally are obvious. Typically, a drain pipe, supply pipe or other conduit is underground or requires repair at a location that is inaccessible. Additionally, repair of a leaking or damaged pipe from the inside seals the wall of the pipe at the point liquid or gas passes through the pipe, often under pressure. The repair is thereby unlikely to later separate from the pipe.

A repair liner is typically fabricated from a woven or matted fiberglass polymer or composite sheet material that is impregnated with a resin and held against the inside wall of the conduit until the resin cures sufficiently to form a structural bond. The composition of the repair liner and bonding agent may vary according to structural requirements, the substance transported in the conduit and the material of the conduit itself. After repair, the damaged pipe section is as strong or stronger than the remainder of the pipe.

Repair of a damaged or leaking conduit using an internal repair liner is usually proceeded by an internal inspection. The conduit segment is cleaned and then inspected, preferably with a light camera probe. The repair location is determined and the size, composition and material weight of the repair liner is selected. A fifty-two ounce Kevlar®/fiberglass fabric impregnated with a thermosetting, polymer resin mix provides a preferred structural repair lining for most situations requiring a strong, durable repair.

To locate the repair liner at the point of repair in the conduit, a liner carrier is drawn into the conduit on a line or cable that has been inserted into the pipe length through access ports on either side of the repair point. Typically, a retrieval line is attached at the back end of the carrier to withdraw the carrier after the repair is completed.

Frequently, the access ports are vertical manholes through which the carrier must be inserted to reach a relatively horizontal pipe. With a length of eight to ten feet, a repair carrier must be flexible enough to bend during placement through the manhole, but rigid enough to minimize sagging when drawn into the horizontal pipe. With the added weight of a resin impregnated repair liner wrapped as a sleeve around the carrier, the problem is exaggerated.

The repair sleeve carrier of this invention provides a unique compromise that resolves the problem. The repair sleeve carrier has a central core that is made of a light-weight segmented flex tubing having an inflatable bladder that encases the tubing and is joined to the tubing at its ends. When deflated, the bladder and core tubing are relatively flexible, facilitating installation. When partially or fully inflated, the expanding bladder pulls the ends together and compresses the flex tube forming a straight rigid conduit.

In the preferred embodiment, the bladder is not directly attached to the ends of the core flex tubing, but to fittings that are in turn slip connected to the ends of the tubing. The tube ends are inserted in sockets of the fittings with sufficient play to allow the assembly to flex, which effectively lengthens the segmented flex tubing. The inner ends of the socket form stops and cause the flex tubing to compress when the bladder is inflated.

In use, a repair liner impregnated with resin is wrapped around the outside of the bladder and tied with breakable ties, forming a sleeve. The liner is overlapped to accommodate the larger diameter wall of the conduit when the bladder is expanded, setting the liner in place. To prevent the liner from adhering to the outside surface of the rubber bladder, the bladder is first covered with an elongated bag or wrap of nylon or other non-stick material. The carrier assembly with the wrapped liner is then pulled to the predetermined location of the repair and the bladder inflated. The inflation stiffens the core tubing creating a uniform radial force on the liner against the wall of the conduit. The repair sleeve is forced against the inside wall of the conduit by the expanded bladder and held there until the repair liner is cured sufficiently to allow withdrawal of the carrier without denigrating the circumferential sealing sleeve. Additional time may be required for a full cure before placing the conduit in service. The core flex tubing allows flow-through of fluid, usually water, where the conduit remains in service during an extended cure.

To minimize the dislodgment of the repair liner during installation, the sleeve carrier is equipped with carriage wheels on the front and back to elevate and center the carrier and repair sleeve in the conduit. Partial inflation of the bladder may be used to minimize sagging of the carrier during transport to the site of the repair. Additionally, the wheeled carriages at each end of the carrier are preferably equipped with cable loops for convenient attachment of the transport lines during installation.

These and other features of the preferred repair sleeve carrier will become apparent upon consideration of the detailed description of the preferred embodiment.

BRIEF DESCRIPTION OF THE DRAWINGS

FIG. 1 is a side view of the improved point repair sleeve carrier, shown with a bend to illustrate the flexible nature of the carrier before inflation.

FIG. 2 is an end view of the sleeve carrier of FIG. 1, showing the wheeled carriage and air supply at one end of the carrier.

DETAILED DESCRIPTION OF THE PREFERRED EMBODIMENT

Figure 3:
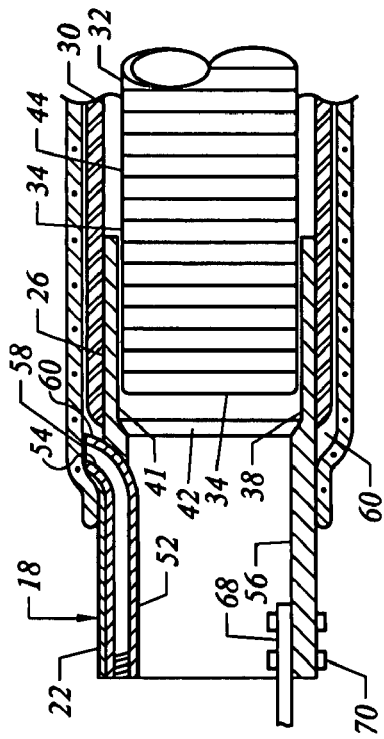
FIG. 3 is a partial cross sectional view of the end of the sleeve carrier, shown in FIG. 2 with the bladder deflated.

The sleeve carrier of this invention, designated generally by the reference numeral 10, has been devised to install repair liners inside conduits. Point repair of underground drain pipe and supply pipe provides substantial savings in time and cost by avoiding excavation and repair or replacement of damaged sections of conduit.

Repair sleeves are formed by wrapped repair liners made from a variety of different fabrics including weaves and mats of composite materials impregnated with resin. Typically, a liner is wrapped around an inflatable bladder of a carrier forming a sleeve. The carrier functions both as a transport device to locate the repair sleeve at the appropriate spot in a pipe and as a packer to force the repair sleeve against the inside wall of the pipe being repaired. The repair sleeve is cured after a relatively short period of time, for example, half an hour. The bladder is then deflated and the carrier removed. Different methods have been used to releasably secure the repair sleeve to the carrier as suggested in the Walsh, et al. reference. Simple disposable twist ties may be used for composite liners of even heavy fabric weight. Placement of the repair sleeve at the desired location, without damage, is greatly aided by the design of the carrier. The novel features of the repair sleeve carrier 10 of this invention facilitate the transport of a repair sleeve to the point of repair with minimal dragging of the sleeve in the pipe, which may cause dislocation of the liner on the carrier and result in an impaired positioning of the liner.

Referring to FIG. 1, the repair sleeve carrier 10 is shown with an elongated body 12 having ends 14 and 16 with metal end fittings 18 and 20. The metal end fittings 18 and 20 are cylindrical and preferably fabricated from aluminum tubing segments with an exposed portion 22 that provides a convenient mount for carriage assembly 24, and a concealed portion 26 on which an expandable bladder 28 is attached to the outer surface 30, as shown in FIGS. 2 and 3.

Referring to FIGS. 2 and 3, and to the breakaway portion of FIG. 1, an internal flex tubing 32 has opposite ends 34, 36 that insert into socket portions 38, 40 of the end fittings 28 and 20. The socket portions 38 and 40 are reamed or milled from the inside of the cylindrical end fittings 18 and 20 to provide sockets 41 with shoulder stops 42 that contact the ends 34, 36 of the flex tubing 32, as shown for end 36 in FIG. 4, when the bladder 28 is inflated. When the bladder 28 is in a fully deflated condition as shown in FIG. 3, the ends 34, 36, are displaced about an inch or so from the shoulder stop 42 to accommodate the incremental lengthening of the flex tubing 32 when the carrier 10 is bent, for example, during insertion into a conduit when fed through a vertical manhole and into a horizontal pipe.

The flex tubing 32 is preferably fabricated of stainless steel and may comprise a length of standard, flexible exhaust pipe or segmented tube. The end fittings 18 and 20 and socket portions 38, 40 of the fittings are sized according to the diameter of the flex tubing 32 being utilized. Usually, a standard 2" or 3" flex tubing 32 is used to provide an adequate flow-through of any drainage water during the installation procedure. The flex tubing 32 is made from a series of inner and outer ring segments 44 that allow the tubing to bend by local displacement of segments 44, but form a relatively rigid straight pipe when the tubing is compressed along its axis. This characteristic is used to advantage in the sleeve carrier 10 by applying forces to the ends 34, 36 of the flex tubing 32 by the end fittings 18 and 20 when drawn together on partial inflation of the bladder 28.

As shown in the cross-sectional view of FIG. 3, the bladder 28 is formed of an inner tube 46 of preferably rubber material which is secured to the concealed portion 26 of the end fittings 18 and 20 by an adhesive. An outer tube 48 is bonded to the underlying secured portion of the inner tube 46, using an adhesive or bonding solvent at one end fitting 20 and to the surface of the other end fitting 18 to provide a pathway for air to inflate the outer tube 48 of the bladder 28.

As shown in FIGS. 1 and 2, inflation of the bladder 28 is accomplished by an auxiliary compressed air supply line 50 that attaches to an internally threaded air supply pipe 52 welded to the inside of the end fitting 18. The supply pipe 52 has an upturned or a bent end 54 that passes through the wall 56 of the fitting 18 with an end opening 58 for discharging air into the cavity 60 formed between the bladder tubes 46 and 48. The end opening 58 includes a side notch 62 to insure air will feed into the cavity 60 and inflate the bladder 28. To insure that the middle portion of the outer tube 48 does not adhere to the inner tube 46 during fabrication and later inflation, a coating or film wrap (not shown) may be applied to the surface of the middle portion of the inner tube 46 before securing the ends of the outer tube 48 as described.

At each end of the sleeve carrier 10 is a wheeled carriage 64. The carriage 64 has a bracket 66 with a tongue 68 extending into the open end of the end fittings 18 and 20. The bracket tongue 68 is fastened to the fittings with bolts 70. The brackets 66 also have downwardly angled legs 72 on which a pair of wheels 74 are mounted with axles 76. The wheel axles 76 have an extended threaded end with nuts 78 that secure a cable loop 80 to provide a convenient attachment device for a tow line (not shown). Typically, tow lines are attached at each end to pull the sleeve carrier 10 into and out of a pipe or conduit to be repaired. The wheeled carriage 64 elevates the sleeve carrier 10 and facilitates transport of the carrier 10 and repair liner wrapped as a sleeve on the carrier into the pipe.

Figure 4:
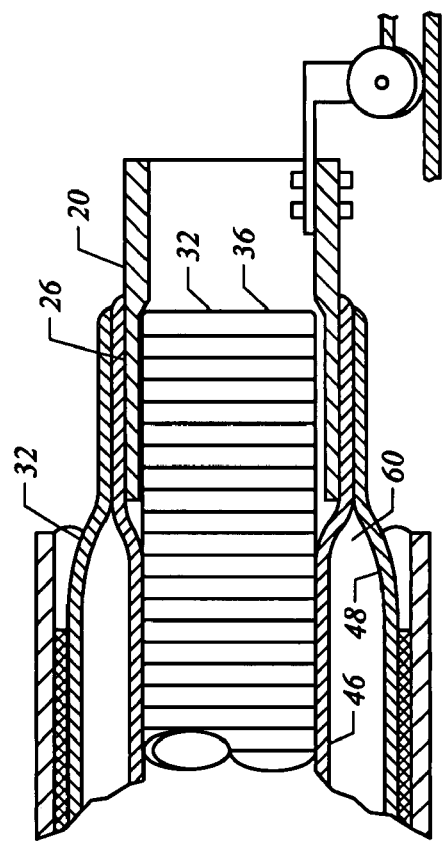
FIG. 4 is a partial cross sectional view of the other end of the sleeve carrier with the bladder inflated and a repair sleeve forced against the inside of a pipe.

As shown in FIG. 4, the sleeve carrier 10, when positioned at the location of repair, is inflated with pressurized air supplied through the air supply line 50 to the cavity 60 formed between the bladder tubes 46, 48. The ends 34, 36 of the inner flex tubing 32 are forced against the shoulder stops 42 of the socket portions 38, 40 of the end fittings 18, 20 (as shown for end fitting 20) by the contraction forces of the inflating bladders 28. By appropriate use of diagonally crossed cording 84 in the outer tube 48, as known in the trade, the force of contraction for degree of expansion can be controlled to apply sufficient force on the core flex tubing 32 to cause it to form a rigid, straight conduit. This feature can be optionally utilized with partial inflation to facilitate transport of the sleeve carrier 10, and a repair sleeve, into the conduit to be repaired. Optionally, the outer surface 92 of the bladder 28 may be coated with a non-stick coating or covering before installing the repair liner on the sleeve carrier 10. When the repair sleeve 86 has sufficiently cured, the sleeve carrier can be deflated and withdrawn from the conduit.

Figure 5:
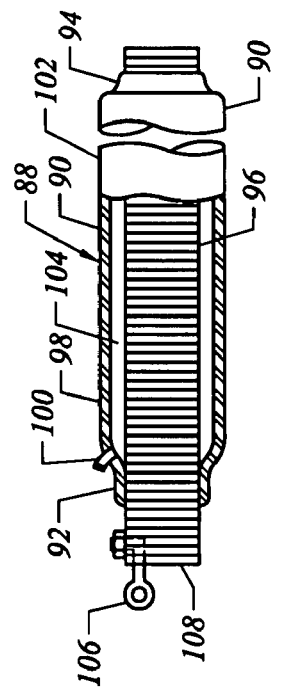
FIG. 5 is a partial cross sectional view of an inexpensive alternate embodiment showing the basic components of the improved point repair sleeve carrier.

FIG. 5 illustrates an inexpensive alternate embodiment of a repair sleeve carrier 88. Since a conventional segmented flex tubing is air-tight, a bladder 90 having ends 92, 94 can be directly attached at its ends to an elongated section of flex tubing 96 as shown. The bladder 90 is constructed with an outer tube 98 and a stem connector 100, similar to a tire valve stem without the internal check valve. The bladder has a middle portion 102 that is not attached to the flex tubing 96 and forms a cavity 104 between the flex tubing 96 and the outer tube 98 where the tube 98 is not attached to the flex tubing 96. The bladder 90 may optionally include an inner tube and/or a wheeled guide carriage as described with reference to the preferred embodiment of FIGS. 1-4. The repair sleeve carrier 88 utilizes a simple, bent eye bolt 106 connected to the exposed end 108 of the flex tubing 96. While lacking in durability and limited reuse, the alternate embodiment includes the key operational features of the improved repair sleeve carrier 10 of the preferred embodiment.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

The invention claimed is:

1. A repair sleeve carrier for installing a repair liner within a conduit comprising:
   an elongated segmented flex tubing having ends wherein the segmented flex tubing has the characteristic of becoming rigid when opposing forces are applied to its ends and becoming flexible when the end forces are removed;
   an elongated bladder having ends and a middle portion wherein the ends of the elongated bladder are connected to the ends of the flex tubing wherein an expandable cavity is formed between the middle portion of the bladder and the flex tubing; and,
   an air supply passage to the cavity having an air supply connector connectable to a pressurized air supply for inflating the bladder wherein the elongated segmented flex tubing becomes substantially rigid when pressurized air is supplied to the bladder and the bladder is inflated with the ends of the elongated bladder applying opposite forces to the ends of the elongated segmented flex tubing.

2. The repair sleeve carrier of claim 1 wherein at least one end has a connector adapted to connect the sleeve carrier to a tow line.

3. The repair sleeve of claim 1 wherein the bladder has an inner tube in addition to the outer tube wherein the inner tube covers a portion of the flex tubing and the cavity is formed between the inner tube and the outer tube.

4. A repair sleeve carrier for installing a repair liner within a conduit comprising:
   an elongated, segmented flex tubing having ends wherein the segmented flex tubing has the characteristic of becoming rigid when opposing forces are applied to its ends and becoming flexible when the end forces are removed;
   first and second end fittings, each fitting having an outside surface and an internal socket wherein the ends of the segmented flex tubing are inserted in the sockets of the end fittings;
   a bladder having an inner tube and an outer tube with the inner tube covering the flex tubing and having ends attached to the outside surface of the end fittings when the flex tubing is inserted into the fittings and with the outer tube covering the inner tube and having ends attached either to the ends of the inner tube or the outside surface of the end fittings wherein a cavity is formed between the inner tube and outer tube; and,
   an air supply connector having a passage from outside the cavity to inside the cavity for inflating the bladder when pressurized air is supplied to the cavity through the air supply connection wherein the elongated segmented flex tubing becomes substantially rigid when pressurized air is supplied to the bladder and the bladder is inflated with the ends of the elongated bladder applying opposite forces to the ends of the elongated segmented flex tubing.

5. The repair sleeve carrier of claim 4 wherein the end fittings have a stop in the internal socket wherein at least one end of the flex tubing is displaced from the stop in the internal socket when the bladder is deflated and engages the stop when the bladder is inflated wherein the flex tubing becomes substantially straight and rigid.

6. The repair sleeve carrier of claim 5 wherein the socket has a shoulder and the stop comprises the shoulder of the socket.

7. The repair sleeve carrier of claim 4 wherein the end fittings have an opening to the flex tubing for flow-through of fluids in a conduit during installation procedures.

8. The repair sleeve carrier of claim 4 wherein the end fittings of each have an attached wheeled carriage that facilitates transport in a conduit.

9. The repair sleeve carrier of claim 4 wherein at least one of the end fittings is connected to a connector that is adapted to connect to a tow line for transport of the repair sleeve carrier in a conduit.

10. The repair sleeve carrier of claim 4 wherein the end fittings have openings and the air supply connector includes an air supply pipe inside one of the end fittings, having a first end at the opening of the fitting and a second end in the cavity for supplying pressurized air into the cavity.

* * * * *